(12) United States Patent
Song et al.

(10) Patent No.: US 8,867,477 B2
(45) Date of Patent: Oct. 21, 2014

(54) COOPERATIVE MIMO AMONG BASE STATIONS WITH LOW INFORMATION INTERACTION, A METHOD AND APPARATUS FOR SCHEDULING THE SAME

(75) Inventors: Yang Song, Shanghai (CN); Liyu Cai, Shanghai (CN)

(73) Assignee: Alcatel Lucent, Boulogne-Billancourt (FR)

(*) Notice: Subject to any disclaimer, the term of this patent is extended or adjusted under 35 U.S.C. 154(b) by 695 days.

(21) Appl. No.: 12/674,238

(22) PCT Filed: Aug. 6, 2008

(86) PCT No.: PCT/CN2008/001430
§ 371 (c)(1),
(2), (4) Date: Sep. 21, 2011

(87) PCT Pub. No.: WO2009/024018
PCT Pub. Date: Feb. 26, 2009

(65) Prior Publication Data
US 2012/0020319 A1    Jan. 26, 2012

(30) Foreign Application Priority Data
Aug. 20, 2007    (CN) .......................... 2007 1 0045052

(51) Int. Cl.
*H04W 72/04* (2009.01)
*H04W 72/12* (2009.01)
*H04W 28/04* (2009.01)
*H04W 48/20* (2009.01)
*H04W 48/16* (2009.01)

(52) U.S. Cl.
CPC .......... *H04W 72/1231* (2013.01); *H04W 28/04* (2013.01); *H04W 48/20* (2013.01); *H04W 48/16* (2013.01)
USPC ............ 370/330; 370/328; 370/329; 370/338

(58) Field of Classification Search
USPC .......................... 370/330, 328, 329, 338, 332
See application file for complete search history.

(56) References Cited

U.S. PATENT DOCUMENTS 6,522,881 B1 * 2/2003 Feder et al. .................... 455/437
7,009,953 B2 * 3/2006 Tiedemann, Jr. ............. 370/332

(Continued)

FOREIGN PATENT DOCUMENTS

| | | |
|---|---|---|
| EP | 1508992 A2 | 2/2005 |
| EP | 1 677 435 A2 | 7/2006 |

(Continued)

OTHER PUBLICATIONS

International Search Report.
European Search Report.

*Primary Examiner* — Rasheed Gidado
(74) *Attorney, Agent, or Firm* — Fay Sharpe, LLP

(57) ABSTRACT

In a wireless network there is a scheduling method in which a base station (BS) acquires information relevant to signal quality between the BS and each mobile terminal and reports to a scheduling apparatus. The scheduling apparatus selects a service BS for each terminal and determines a specific BS to compensate for interference; and may provide further controls to correspondingly transmit service data of the terminal to the service BS. The BS determines the serviced terminal and the terminal of which the interference is eliminated. When servicing the terminal on a time-frequency resource and eliminating the interference from other BS, the BS may only acquire channel state information of the terminal associated with the BS to the BS on the corresponding time-frequency resource and calculate a pre-coded matrix, so as to pre-code terminal service data from the service BS and generate downlink signals to be transmitted.

13 Claims, 6 Drawing Sheets

(56) References Cited

U.S. PATENT DOCUMENTS

| | | | |
|---|---|---|---|
| 7,447,506 B1* | 11/2008 | MacKenzie et al. | 455/453 |
| 8,005,175 B2* | 8/2011 | Yang et al. | 375/346 |
| 8,116,267 B2* | 2/2012 | van Rensburg et al. | 370/329 |
| 8,155,098 B2* | 4/2012 | Huang et al. | 370/343 |
| 2002/0150063 A1* | 10/2002 | Tran | 370/332 |
| 2003/0069043 A1* | 4/2003 | Chhaochharia et al. | 455/561 |
| 2005/0227703 A1* | 10/2005 | Cheng | 455/456.1 |
| 2007/0160162 A1* | 7/2007 | Kim et al. | 375/267 |
| 2008/0070576 A1* | 3/2008 | Sanders et al. | 455/436 |
| 2008/0096488 A1* | 4/2008 | Cho et al. | 455/69 |
| 2009/0047984 A1* | 2/2009 | Gollamudi et al. | 455/513 |
| 2009/0207780 A1 | 8/2009 | Kishigami et al. | |

FOREIGN PATENT DOCUMENTS

| | | |
|---|---|---|
| EP | 1703645 A1 | 9/2006 |
| EP | 1 811 794 A1 | 7/2007 |
| JP | 2006-191533 | 7/2006 |
| JP | 2006191620 A | 7/2006 |
| JP | 2007-195179 | 8/2007 |
| WO | WO 2006/016485 A1 | 2/2006 |
| WO | WO 2006/063138 A2 | 6/2006 |
| WO | WO 2007/046621 A1 | 4/2007 |
| WO | WO 2007/052941 | 5/2007 |
| WO | WO 2007/053066 | 5/2007 |

* cited by examiner

COOPERATIVE MIMO AMONG BASE STATIONS WITH LOW INFORMATION INTERACTION, A METHOD AND APPARATUS FOR SCHEDULING THE SAME

TECHNICAL FIELD

The invention relates to the suppression of inter-cell interference (ICI) in wireless network, particularly relates to a method and apparatus for the suppression of ICI through cooperative multiple-input multiple-output (MIMO) wireless transmission among multiple base stations.

BACKGROUND OF THE INVENTION

In a wireless system with reuse of frequency resource, ICI introduced by the frequency reuse is an important factor limiting the downlink capacity. When an mobile terminal located in the cell boundary, that is, inter-cell area, receives a significant signal from its dominating base station (Base station, BS), it also receives signal from other base station(s) via the same time-frequency resource. And the signal from other base station(s) constitutes an interference to this mobile terminal.

In an OFDM/OFDMA system, there are 2 solutions involving cooperation among multiple base stations to solve the foregoing issue, as bellows:

1. Macro Diversity

Based on the solution of Macro macro diversity, for a mobile terminal located in the cell boundary, both the base station (BS) to which the mobile terminal currently belongs and the base station (BS) to which the mobile terminal are approaching send the same signal via the same time-frequency resource, i.e. time slot and sub-carrier. Thus, interference suppression and diversity gain can be achieved since the base stations have individual transmission channels respectively.

The drawback of macro diversity solution lies in that adjacent base stations are required to send the same signal to the same mobile terminal via the same time-frequency resource, which limits the total user number supported by the system.

2. Network MIMO

Base on network MIMO, all antennas of all base stations act together as a single radio antenna array. According to all the Channel Status Information (CSI), e.g. channel response array, between all base stations and mobile terminals, a pre-coding matrix is generated to enable the joint precoding among multiple base stations to eliminate the co-channel interference (CCI) among user terminals. Since the CSI between all base stations and mobile terminals are taken into account in the precoding of this technology, interference introduced by reuse of time-frequency resource is diminished to the extreme extent by network MIMO and optimal performance is attained.

The optimal performance is attained, yet at the expense of introducing an extremely high computation complexity, by the above solution, and it is of a more severity that since each base station needs an exchange of its own related channel information via the backhaul network, wherein the backhaul network is used for the interaction of the data and signaling between base stations and between base station(s) and its (their) scheduling apparatus, a high consumption of network resource caused by large scale of information transmission improves the backhaul network load and delay of the information transmission degrades system performance.

Thus, a new solution is needed to overcome the above issue in the current technology, which should suppress the above interference effectively without introducing too much requirement for the consumption of backhaul network resources, and meanwhile have a low computation complexity.

SUMMARY OF THE INVENTION

To attain the object suggested above, the present invention provides a multi-base station cooperative MIMO with low information interaction, wherein:

Multiple base stations may serve the same mobile terminal in MIMO mode via the same time-frequency resource;

One base station may simultaneously serve multiple mobile terminals in SDMA mode via the same time-frequency resource;

When serving multiple mobile terminals on one time-frequency resource is required and eliminating the interference for other mobile terminal is not needed, or when serving one or multiple more mobile terminals on one time-frequency resource is required and eliminating the interference for other one or more mobile terminals is also needed concurrently, the base station needs to pre-code the to-be-transmitted data. All mobile terminals, including the one(s) for of which the interference base station is eliminated eliminating the interference by the base station and the one(s) also served by the base station, are considered as the mobile terminals associated with the base station. Particularly, according to the present invention, at the base stations where precoding is needed, the process of generation of pre-coded matrix is independently carried out in various base stations. That is, to calculate a pre-coded matrix, each base station only needs to acquire channel state information (CSI), specifically based on the channel estimation of the base station or on the feedback from the mobile terminal, between the base station and the mobile terminal for which service and interference elimination should be provided by the base station on the corresponding time-frequency resource, which is determined by the scheduling apparatus.

When service should be provided to mobile terminal on merely one time-frequency resource and no interference elimination is needed for any mobile terminal, no pre-coding is needed. Those skilled in the art should understand that, pre-coding in present invention specifically refers to the pre-coding utilizing the pre-coded matrix generated based on the CSI and used for differentiating multiple user spatially. And the pre-coding differs from the MIMO pre-coding for individual user, e.g. STBC etc.

it is determined by a scheduling apparatus, especially by a device/module for scheduling in the scheduling apparatus, whether a mobile terminal should be jointly served by multiple cooperative base stations and whether a base station should serve multiple mobile terminals or eliminate their interference.

The scheduling apparatus can be either a physically individual network device or be integrated into the base station physically.

The way the scheduling apparatus schedules the MIMO communication between a base station and mobile terminal is as follows:

The base station acquires signal-quality-related information between the base station and each adjacent mobile terminal, and reports to a scheduling apparatus to which the base station belongs, wherein the base station reports the signal-quality-related information indicating that a mobile terminal is about to conduct a inter-cell handoff, and the identification information of the mobile terminal to the scheduling apparatus. And signal-quality-related information indicating that the signal quality is above the fourth predetermined threshold, and the identification information of the mobile terminal can also be reported to the scheduling apparatus by the base station.

Subsequently, according to the signal-quality-related information reported by all the cooperative base stations under its control, the scheduling apparatus selects, for each mobile terminal, at least one base station to transmit the downlink signal to the mobile terminal, which will be jointly referred to as service base station hereafter, a mobile terminal may have one or more service base stations, the scheduling apparatus also determines, when necessary, a base station to eliminate the interference for a specific mobile terminal on a specific time-frequency resource, and reports the scheduling result to the base station(s). And, according to the scheduling result, for each mobile terminal, the scheduling apparatus further controls to correspondingly transmit service data of the mobile terminal to its service base station.

Then, according to the scheduling result from the scheduling apparatus, each base station determines the to-be-served mobile terminal(s) and the mobile terminal(s) for which the interference should be eliminated. Next, each base station calculates a pre-coded matrix to generate signals to be transmitted utilizing CSI between this base station and the to-be-served mobile terminal(s) and between this base station and the mobile terminal(s) for which the interference should be eliminated.

According to one embodiment of the present invention, there is provided a method, in a scheduling apparatus of a wireless network, for scheduling MIMO communication between mobile terminal and multiple cooperative base stations located in the cooperative area under the control of the scheduling apparatus, comprising the steps of: a. acquiring signal-quality-related information between each of the multiple cooperative base stations and the corresponding multiple mobile terminals in vicinity of the base station; b. when a signal-quality-related information relevant to a mobile terminal indicates that the difference among the quality of multiple optimal signals is less than a first predetermined threshold, indicating at least two base stations among the multiple base stations relevant to the quality of multiple optimal signals to serve as service base stations of the mobile terminal and to transmit downlink signal to the mobile terminal via the same time-frequency resource.

According to another embodiment of the present invention, there is provided a method, in a base station of a wireless network, for conducting a MIMO communication based on scheduling with a mobile terminal, comprising the steps of: A. acquiring signal-quality-related information between the base station and each mobile terminal in its vicinity; B. acquiring the indication information relevant to the base station, indicating mobile terminals associated with the base station; C. when the indication information indicates that mobile terminals associated with the base station includes multiple mobile terminals which need a downlink signal transmission via the same time-frequency resource from the base station, generating a pre-coded matrix according to the CSI between the base station and the multiple mobile terminals; D. pre-coding, by utilizing the pre-coded matrix, the service data to be transmitted to the multiple mobile terminals so as to generate pre-coded downlink signals to be transmitted to the multiple mobile terminals.

Accordingly, when the indication information indicates that the mobile terminals associated with the base station actually include a mobile terminal to which the base station is required to transmit a downlink signal as well as a mobile terminal for which the base station is required to eliminate interference, the base station generates a pre-coded matrix utilizing the CSI between the base station and the mobile terminal to which the base station is required to transmit a downlink signal and the CSI between the base station and the mobile terminal for which the base station is required to eliminate interference.

According to yet another embodiment of the present invention, there is provided a scheduling means, in a scheduling apparatus of a wireless network, for scheduling MIMO communication between mobile terminals and multiple cooperative base stations located in the cooperative area under the control of the scheduling apparatus, comprising: a signal acquiring unit for acquiring signal-quality-related information between each of the multiple cooperative base stations and the corresponding multiple mobile terminals in vicinity of the base station; a first indication unit for, when a signal-quality-related information relevant to a mobile terminal indicates that the difference among the quality of multiple optimal signals is less than a first predetermined threshold, indicating at least two base stations among the multiple base stations relevant to the quality of multiple optimal signals to serve as service base stations of the mobile terminal and to transmit downlink signal to the mobile terminal via the same time-frequency resource.

According to yet another embodiment of the present invention, there is provided a communication means, in a base station of a wireless network, for conducting a MIMO communication based on scheduling with a mobile terminal, comprising: a signal quality acquiring unit for acquiring signal-quality-related information between the base station and each mobile terminal in its vicinity; an indication information acquiring unit for acquiring the indication information relevant to the base station, and the indication information is used for indicating the mobile terminals associated with the base station; a matrix generating unit for, when the indication information indicates that the mobile terminals associated with the base station include multiple mobile terminals which need a downlink signal transmission via the same time-frequency resource from the base station, generating a pre-coded matrix according to the CSI between the base station and the multiple mobile terminals; and a pre-coding device for pre-coding, by utilizing the pre-coded matrix, the service data to be transmitted to the multiple mobile terminals so as to generate pre-coded downlink signals to be transmitted to the multiple mobile terminals.

The present invention includes, but is not limited to the following advantages:

1. attaining the effective suppression of inter-cell interference;

2. throughput is improved due to that one or more base stations may serve multiple mobile terminals via the same time-frequency resource while suppressing the inter-user interference;

3. the information for scheduling in present invention does not consume much resources of backhaul network because data size is small, in comparison to the channel response matrix H (a multidimensional complex matrix) via backhaul network in which the network MIMO happens, if a relative signal strength indicator (RSSI) or a channel quality indicator (CQI) is employed as the signal-quality-related information. Moreover, since the base station, preferably, may selectively report signal-quality-related information between portion of the mobile terminals and itself to the scheduling apparatus, consumption of the resources of backhaul network can be further reduced. And likewise, transmission of the scheduling result merely consumes little backhaul network resources.

4. There is a little need of computation for the base station to generate pre-coded matrix in present invention, which is quite limited. Since pre-coding process is independently carried out in various base stations, for one base station, it merely needs to detect and acquire the CSI, informed by the scheduling apparatus, between the base station itself and mobile terminal associated with it so as to carry out the pre-coding. And pre-coding conducted by the base station has nothing to do with the CSI between the base station and mobile terminal non-associated with it, not to speak of the CSI between other base station and mobile terminal associated with the other base station.

BRIEF DESCRIPTION OF THE DRAWINGS

Other features, aspects and advantages of the present invention will become obvious by reading the following description of non-limiting embodiments with the aid of appended drawings. Wherein, same or similar reference numerals refer to the same or similar steps or units/means/apparatus.

DETAILED DESCRIPTION OF EMBODIMENTS

Figure 1:
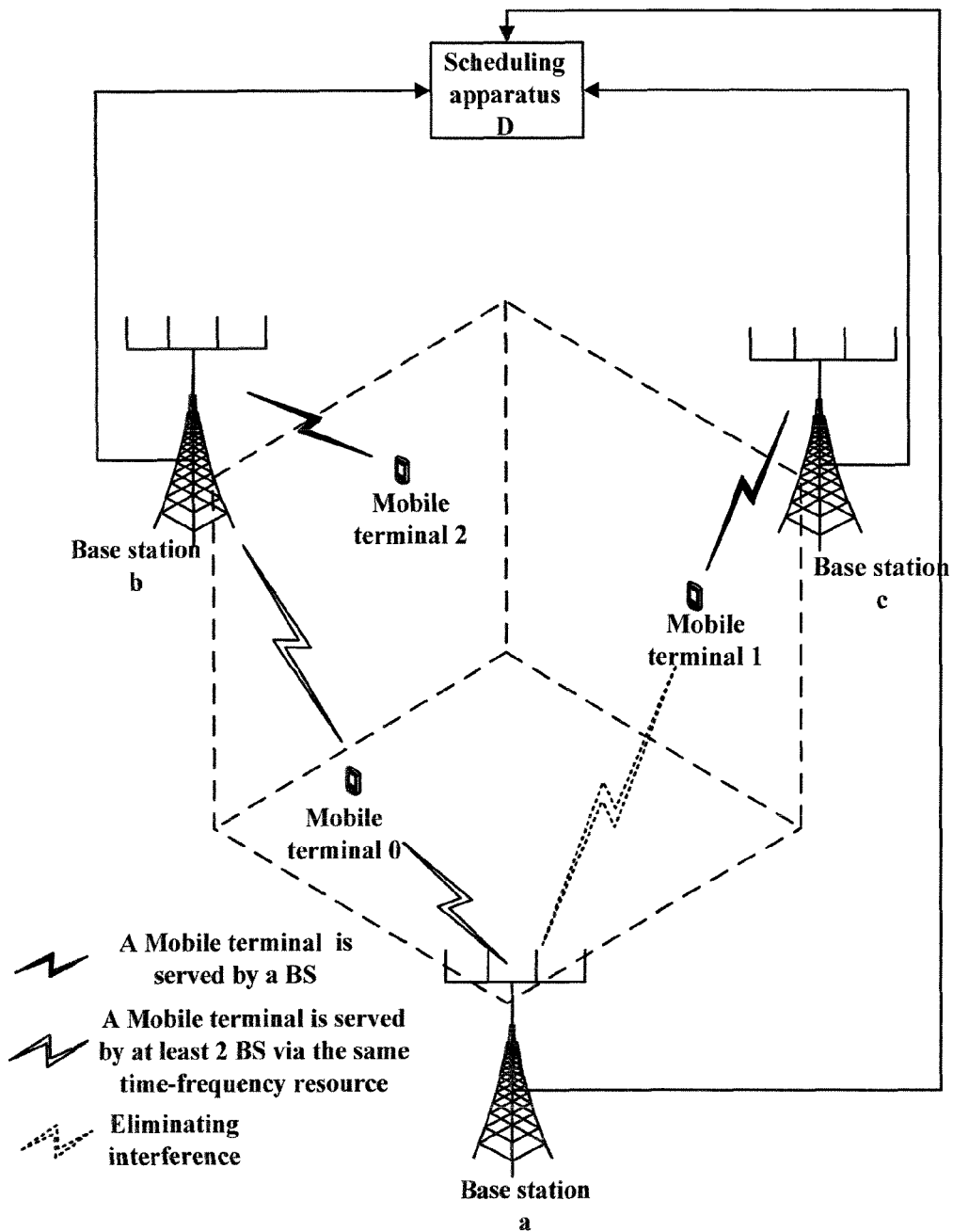
FIG. 1 shows a topology diagram of a wireless network for supporting the scheduling of the communication between a base station and mobile terminals according to one embodiment of the present invention.

FIG. 1 shows a topology diagram of wireless network for supporting the scheduling of the communication between the base station and mobile terminal according to one embodiment of the present invention. It should be understood by those skilled in the art that the depicted network may be WiMAX network, 3G network or next generation mobile communication network, and is not limited to these specific embodiments. Each base station located in the cooperative area under the control of a scheduling apparatus, that is, each base station communicatively coupled to the scheduling apparatus, is referred to as a cooperative base station hereafter, as is just like the base stations a, b, c in FIG. 1. The scheduling apparatus can be either a physically individual network device or integrated into a base station. It should be understood that the scheduling apparatus is not limited to be an independent network equipment or base station, it may be a network equipment dedicated for carrying out the scheduling solution of the present invention.

Explanation is made for the present invention from the system perspective in view of FIG. 1:

Firstly, each base station respectively acquires signal-quality-related information between the base station itself and each mobile terminal in its vicinity. The signal-quality-related information may be a relative signal strength indicator (RSSI), a channel quality indicator (CQI), or CSI, e.g. instant or long-time channel response, and so on. Taking RSSI for instance, the way the base station acquires signal-quality-related information includes that:

the base station asks each mobile terminal in its vicinity for a transmission of a sounding signal to the base station itself via a specified time-frequency resource, and then the base station measures the quality of the sounding signal to obtain the signal-quality-related information.

the base station transmits, to every mobile terminals in its vicinity, a signal dedicated for conducting signal quality measurement, e.g. pilot signal etc., then the mobile terminals feedback the measured signal-quality-related information to the base station;

the base station directly obtains the signal-quality-related information by measuring the uplink traffic signal from the mobile terminals.

It should be understood that the signal-quality-related information acquired by each base station needs to be converged to the scheduling apparatus via the backhaul network, therefore, it is preferably characteristic of small data size. In comparison to the channel response matrix H with a large data size, RSSI or CQI is the preferable signal-quality-related information since it is just a simple number.

Next, each base station reports the acquired signal-quality-related information, taking RSSI as an example hereafter, to the scheduling apparatus D via the backhaul network. Wherein, the base station may report, without any screening, all the acquired RSSI with identification of the corresponding mobile terminal to the scheduling apparatus D; or may report those RSSI of which signal quality is above a fourth predetermined threshold among all the RSSI, those RSSI to which the mobile terminal corresponding is being indicated to be about to handoff, and together with identification of the corresponding mobile terminal to the scheduling apparatus D, because other RSSI with worse signal quality is useless for scheduling process of the scheduling apparatus D so that load of the backhaul network is further reduced to some extent. For this instance, providing that each base station report all the gathered RSSI to the scheduling apparatus D and the RSSI converged to scheduling apparatus D includes those RSSI between each cooperative base station and each mobile terminal in FIG. 1.

Subsequently, scheduling apparatus D applies an analysis to the converged RSSI so as to schedule the MIMO communication between each cooperative base station and each mobile terminal. Without loss of generality, some example is taken for the RSSI-based scheduling strategy of scheduling apparatus D as follows:

when RSSI indicates that the relationship of the signal quality, abbreviated as $S_X$, wherein X is the reference number for corresponding base station, between a mobile terminal and base station a,b,c as follows: $S_a > S_b > S_c$, and $S_a - S_b <$ a first predetermined threshold TH1, and $S_a-S_c$>TH1, then, scheduling apparatus D indicates that base stations a,b cooperatively serve the mobile terminal in MIMO mode via the same time-frequency resource, e.g. T1F1. Wherein the mobile terminal 0 is assumed to meet the above condition and be served by base stations a,b.

It should be appreciated by those skilled in the art that when $S_a$>$S_b$>$S_c$ and $S_a-S_c$<TH1, scheduling apparatus D may indicate, based on space division capability of each base station and receiving capability, e.g. number of the receiving antenna etc., of the mobile terminal, 2 of the 3 base stations a,b,c or all of the 3 base stations to serve the mobile terminal via the same time-frequency resource.

In the present invention, there is a relationship between the number of the transmitting antenna of the base station and the space division multiple address and interference elimination technology used during the period that multiple mobile terminals are served or the interference of one/more mobile terminal, served by the base station, is eliminated. That is, the number, referred to as space division capability, of mobile terminals that a base station can cover via a single time-frequency resource, including the mobile terminals served by the base station and the mobile terminals for which interference need to be eliminated by the base station, is limited to the number/spacing of the transmitting antenna of the base station. Thus, according to one preferable embodiment of the present invention, scheduling apparatus D takes the remaining space division capability of each base station via each time-frequency resource into consideration in the course of its scheduling. For example, a base station has a space division capability of 2 and it is serving 2 mobile terminals via T2F2, at this time, scheduling apparatus D does not send a more requirement that the base station serve a new mobile terminal or apply interference elimination to a new mobile terminal via T2F2. Of course, scheduling apparatus D may not consider the remaining space division capability of each base station, instead, it is the base station that determines whether to accept the scheduling of this time according to the remaining space division capability of its own after receiving the indication information from scheduling apparatus D.

when RSSI indicates that the difference between the optimum signal quality and the sub-optimum signal quality is more than a second predetermined threshold and the mobile terminal is located within the cooperative area, indicate the base station corresponding to the optimum signal quality to serve the mobile terminal. Wherein mobile terminals 1,2 are assumed to meet the above condition and are independently to be served by base station c, b respectively.

Those skilled in the related art can determine an appropriate value for the predetermined thresholds in present invention without creative effort, so, no more is necessary to be mentioned about this hereafter.

According to one embodiment of the present invention, while scheduling apparatus D specifies the corresponding service base station for each mobile terminal, it also determines a time-frequency resource, used for the transmission of downlink signal to the mobile terminal, for the service base station. Providing that scheduling apparatus D determines the same one time-frequency resource: T1F1, used for the transmission of downlink signal to the corresponding mobile terminal shown in FIG. 1, for each cooperative base station, then while base station a,b cooperatively transmit downlink signal to mobile terminal 0, base stations c,b are also using T1F1 to transmit independently downlink signal to mobile terminals 1, 2 respectively, so, the interference therein is necessary to be considered.

According to one embodiment of the present invention, scheduling apparatus D may indicate base station c to suppress the interference introduced to mobile terminal 0 by transmission to mobile terminal 1 when base station c is transmitting the signal to mobile terminal 1, and indicate base stations a,b to suppress the interference introduced to mobile terminal 1 by transmission to mobile terminal 0 when the base stations a,b are transmitting the signal to mobile terminal 0.

According to one embodiment of the present invention, only when the quality of signal between base station c and mobile terminal 0 is above a third predetermined threshold, does scheduling apparatus D indicate base station c to suppress the interference introduced to mobile terminal 0 by transmission to mobile terminal 1 while, at the same time, base station c transmit the signal to mobile terminal 1; likewise, when the quality of signal between base stations a,b and mobile terminal 1 is not above the third predetermined threshold, scheduling apparatus D does not indicate base stations a,b to suppress the interference introduced to mobile terminal 1 by transmission to mobile terminal 0 when they are transmitting the signal to mobile terminal 0.

Mobile terminal associated respectively with the each shown cooperative base station can hither be determined as follows:

base station a: to serve mobile terminal 0 via the same time-frequency resource, e.g. T1F1, with that of base station b, and eliminate the interference introduced to mobile terminal 1;

base station b: to serve mobile terminal 0 with base stations a via the same time-frequency resource, T1F1, and serve mobile terminal 2 via T1F1;

base station c: to serve mobile terminal 1 via T1F1.

Then, scheduling apparatus D informs each base station with the above information and the corresponding time-frequency resource, and control to push service data, to be transmitted to each mobile terminal, to the corresponding service base station.

Each base station transmits downlink signal to the mobile terminal to be served by the base station according to the instruction from scheduling apparatus D, and concurrently eliminate the interference introduced to some mobile terminal according to the instruction from scheduling apparatus D. Description is given for each base station respectively as bellows:

Base Station a

As mentioned above, besides having to serve mobile terminal 0, base station a needs to eliminate the interference introduced to mobile terminal 1 since it is communicatively coupled to mobile terminal 1 with a strong signal but does not have to serve mobile terminal 1. The signal quality between mobile terminal 1 and base station c is better, by a second predetermined threshold, the signal quality between mobile terminal 1 and base station a. With the above condition, base station a needs to pre-code the service data to be transmitted to mobile terminal 0. According to the information of mobile terminal, associated with base station a under the instruction of scheduling apparatus D, the information for base station a to generate the pre-coding matrix merely includes: the CSI, i.e. instant channel response matrix H_a0, between base station a and mobile terminal 0 and the CSI, i.e. instant channel response matrix H_a1, between base station a and mobile terminal 1. After generating the pre-coded matrix based on the prior art, base station a pre-codes, by utilizing the pre-coded matrix, the service data to be transmitted to mobile terminal 0 so as to get the pre-coded downlink signal to be transmitted to mobile terminal 0. And in details, multi-user MIMO or beam forming can be utilized for a null steering in the direction to mobile terminal 1 so that while the base station a is serving mobile terminal 0, it also can diminish the interference introduced to mobile terminal 1.

The time-frequency resource of T1F1 used by base station a to transmit downlink signal to mobile terminal 0 can be coordinated by scheduling apparatus D, and is also used for base station b to serve mobile terminal 0. The cooperative working mode of base station a,b includes but not limited to Space-time coding, spatial multiplexing, spatial diversity and so on. With spatial multiplexing as an example, description is made as follows:

Scheduling apparatus D may control to divide the channel-coded service data: $\{S(0), S(1), S(2), \ldots, S(2n), \ldots\}$, to be transmitted to mobile terminal 0, to the corresponding service base station, into 2 signal streams, and transmit them to base station a and base station b correspondingly, wherein the signal stream to the base station a is: $\{S(0), S(2), S(4), \ldots, S(2n), \ldots\}$; and the signal stream to the base station b is: $\{S(1), S(3), S(5), \ldots, S(2n-1), \ldots\}$. then, base station a pre-code the service data: $\{S(0), S(1), S(2), \ldots, S(2n), \ldots\}$ by utilizing the above pre-coded matrix.

Scheduling apparatus D may transmit the entire service data to the above 2 service base station of mobile terminal 0, and channel-coding is completed by 2 service base station respectively to accomplish $\{S(0), S(1), S(2), \ldots, S(2n), \ldots\}$ and next, base station a and base station b determines, based on pre-settings or scheduling, signal streams which is for base station a and base station b to transmit respectively to mobile terminal 0.

In the case where the 2 base stations transmit downlink signal to mobile terminal 0 by utilizing space-time coding, Scheduling apparatus D may apply the space-time coding to the channel-coded service data, and transmit one of the 2 coded signals to base station a and the other to base station b. Base station a applies a pre-coding to the space-time coded signal; or, with transmitting the entire service data to base station a and base station b, Scheduling apparatus D allows them to apply respectively a channel-coding to get $\{S(0), S(1), S(2), S(2n), \ldots\}$ and complete the space-time coding, then respectively select, based on pre-settings or scheduling, one signal stream to transmit to mobile terminal 0 after applying pre-coding.

As mentioned above, the signal-quality-related information acquired by each base station varies in their form. When it takes the form of RSSI or CQI, the base station needs to acquire separately a CSI, e.g. instant channel response matrix H, before the base station applies the pre-coding. When it takes the form of CSI, the base station directly applies the acquired CSI to the generation of pre-coded matrix when it performs the pre-coding. During the interval between a scheduling and the one next to it, the base station may acquire the CSI repeatedly to real-timely update their own pre-coded matrix.

It can be directly discerned that, with the present invention, when performing the computation of the pre-coded matrix, each base station does not need to interact with other base station about the CSI used for calculating the pre-coded matrix, it just needs to fulfill, according to CSI acquired by itself, the pre-coding with a good performance of interference suppression, which avoids a large consumption of backhaul network resources.

Base Station b base station b needs to serve mobile terminals 0,2 by utilizing T1F1, without having to eliminate the interference for any mobile terminal.

Therefore, base station b needs to acquire the CSI between itself and mobile terminal 0, and the CSI between itself and mobile terminal 2, which, for example, includes that: the instant channel response matrix H_b0 between base station b and mobile terminal 0, and the instant channel response matrix H_b2 between base station b and mobile terminal 2, to generate the pre-coded matrix used for pre-coding the service data to be transmitted to mobile terminals 0,2 based on the prior art. The pre-coded matrix can make sure that the signal bound to a mobile terminal can be received correctly and no or little interference is introduced to another mobile terminal. After the service data is pre-coded by utilizing the pre-coded matrix, a pre-coded downlink signal, to be transmitted to mobile terminals 0,2, is achieved. It should be understood that, the abovementioned can be implemented based on multi-user MIMO or beam forming technique, Just as abovementioned, base station b and base station a cooperatively serve mobile terminal 0 by utilizing any kind of MIMO technique for single user in coordination, and may also serve mobile terminal 2 with any kind of MIMO technique for single user, for example, space-time coding, spatial multiplexing, spatial diversity and so on, which will not be mentioned redundantly hereafter.

Base Station c base station c needs to merely transmit downlink signal to mobile terminal1 by utilizing T1F1, without having to eliminate the interference for any mobile terminal.

base station c may also serve mobile terminal 1 with any kind of MIMO technique for single user, for example, space-time coding, spatial multiplexing, spatial diversity and so on, which will not be mentioned redundantly hereafter.

According to one embodiment of present invention, multiple cooperative areas can also achieve inter-area cooperation through the information interaction among the scheduling apparatuses.

Detailed description is given from a system perspective as above. Next, description is given respectively from the side of scheduling apparatus and base station with reference to FIG. 1 and in view of the method flow chart and device functional block diagram.

Figure 2:
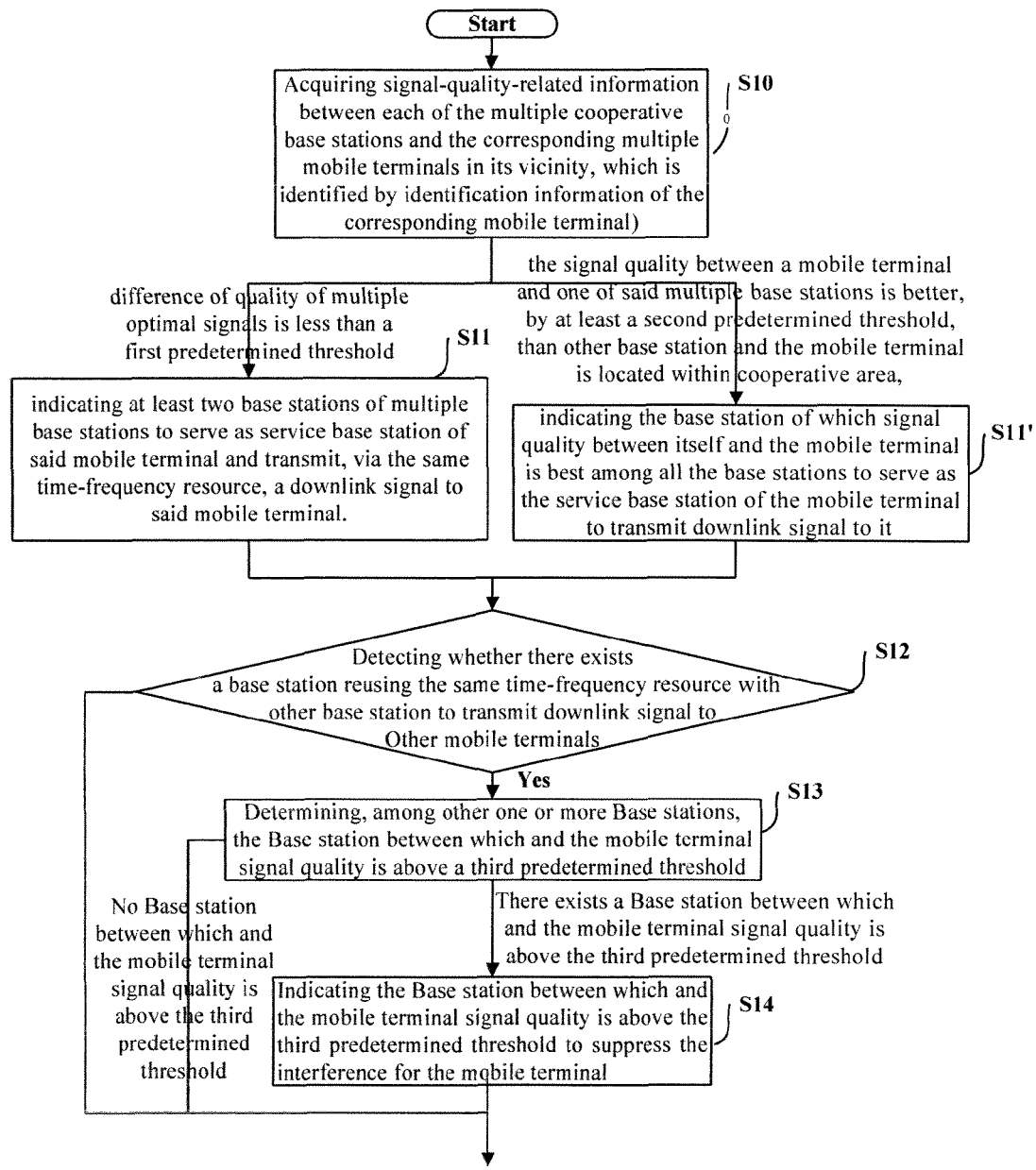
FIG. 2 shows a flow chart of the method for scheduling MIMO between mobile terminal and multiple cooperative base stations located in the cooperative area under the control of a scheduling apparatus in the scheduling apparatus of the wireless network according to one embodiment of the present invention.

FIG. 2 shows a flow chart of the method for scheduling MIMO between mobile terminal and multiple cooperative base stations located in the cooperative area under the control of a scheduling apparatus in the scheduling apparatus of the wireless network according to one embodiment of the present invention.

Firstly, in step S10, scheduling apparatus D acquires signal-quality-related information, which is identified by identification information of the corresponding mobile terminal, between base stations a, b, c and mobile terminals in their respective vicinity. In this embodiment, scheduling apparatus D is a network device physically separated to each base station, and receives the signal-quality-related information, e.g. RSSI, between each base station and mobile terminal 0, mobile terminal 1, mobile terminal 2, which is reported by base station a, b, c. In a variation, assuming that the functionality of scheduling apparatus D in integrated into base station a, then, for base station a, implementation of step S10 comprises: base station a acquires the RSSI between itself and mobile terminals 0, 1, 2; base station a receives the RSSI reported by base station b, c. Without loss of generality, exemplary description is given as follows for the case in which base station is physically separated to scheduling apparatus D as shown in FIG. 1.

After signal-quality-related information is acquired, step S11 is performed, wherein, scheduling apparatus D schedules the MIMO communication between each cooperative base station and each mobile terminal according to the RSSI reported by each base station, just as follows:

for mobile terminal 0, with the indication by RSSI that the relationship of the signal quality, abbreviated as $S_X$ with X is the reference number for corresponding base station, between it and base station a,b,c as follows: $S_a > S_b > S_c$, and $S_a - S_b <$ a first predetermined threshold (TH1), and $S_a - S_c >$ TH1, then, scheduling apparatus D indicates in step S11 that base station a,b cooperatively serve as the service base station of mobile terminal 0 and transmit, by utilizing the same time-frequency resource T1F1, downlink signal to mobile terminal 0. Wherein the mobile terminal 0 is assumed to meet the above condition and be served by base stations a,b. Considering the number of base stations by which one mobile terminal can be served concurrently depends on receiving capability and the MIMO mode adopted by the mobile terminal, thus, when the signal quality between one mobile terminal and base station a, b, c respectively is almost the same with each other, scheduling apparatus D determines at least one of the 3 base stations to serve the mobile terminal according to its receiving capability and corresponding MIMO mode. In this embodiment, without loss of generality, one mobile terminal is assumed to be served by, at most, 2 base stations concurrently.

for mobile terminals 1, 2, with their respective indication that the signal quality between them two and one base station is good and even better than the signal quality between them and any other base station by a second predetermined threshold, in step S11', scheduling apparatus D indicates that base station c, which ranks first among all the base stations for signal quality between mobile terminal 1 and all the base stations respectively, serve as the service base station of mobile terminal 1 to transmit downlink signal to it.

Providing that scheduling apparatus D indicates base stations a, b, c transmit independently, by utilizing the same time-frequency resource T1F1, downlink signal to their served mobile terminals respectively.

Then, in step S12, scheduling apparatus D can detect that base stations a, b, c transmit independently, by utilizing the same time-frequency resource, downlink signal to their served mobile terminal respectively. Hereafter, merely based on the above, scheduling apparatus D may indicate each cooperative base station under its control to eliminate the interference introduced by the reuse of time-frequency resource.

However, there exists a blindness in the above way. For an instance, even if base station a transmits, by its maximum power, downlink signal to mobile terminal 0 which is served by base station a without eliminating the interference of mobile terminal 2, the signal quality of the signal from base station has been severely deteriorated, before the signal reaches mobile terminal 2, which leads little interference to mobile terminal 2, because base station a is very far away from mobile terminal 2. If, at this time, base station a is indicated to transmit downlink signal to mobile terminal 0 via by utilizing T1F1 and eliminate the interference for mobile terminal 2 at the same time, then spatial diversity on the resource of T1F1 will be consumed in vain.

Based on this, in step 13, scheduling apparatus D detects that different base stations transmit downlink signal to different mobile terminal via the same time-frequency resource, then, taking mobile terminal 0 as an example, step S13 is executed preferably, that is, it is determined upon the signal-quality-related information whether the signal quality between base station c and mobile terminal 0 is higher than a third predetermined threshold. Only when the quality of signal between base station c and mobile terminal 0 is above the third predetermined threshold, Step S14 is performed to indicate base station c to suppress the interference introduced to mobile terminal 0 by transmission to mobile terminal 1 when the base station c is transmitting the signal to mobile terminal 1; likewise, for mobile terminal 1, only when the determination in step S13 denotes that the quality of signal between either base station a or base station b and mobile terminal 1 is more than the third predetermined threshold, does scheduling apparatus D indicate, in Step S14, that the corresponding base station to suppress the interference introduced to mobile terminal 1. For mobile terminal 2, it follows a rule similar to the above the determination of whether the base stations a,c needs to apply an interference suppression to it.

Preferably, scheduling apparatus D also considers the spatial diversity of each base station via some time-frequency resource. For an instance, assuming that spatial diversity of base station a is 2, representing that the total number of mobile terminal that the base station a can both serve and eliminate interference for does not exceed 2, then, after the determination that base station a serves mobile terminal 0 via T1F1, base station has only 1 spatial diversity remained on T1F1. And after the further determination that base station a applies interference suppression to mobile terminal 1 via T1F1, base station a has no spatial diversity left on T1F1, and it can not serve more mobile terminal or apply interference suppression to more mobile terminal.

Figure 3:
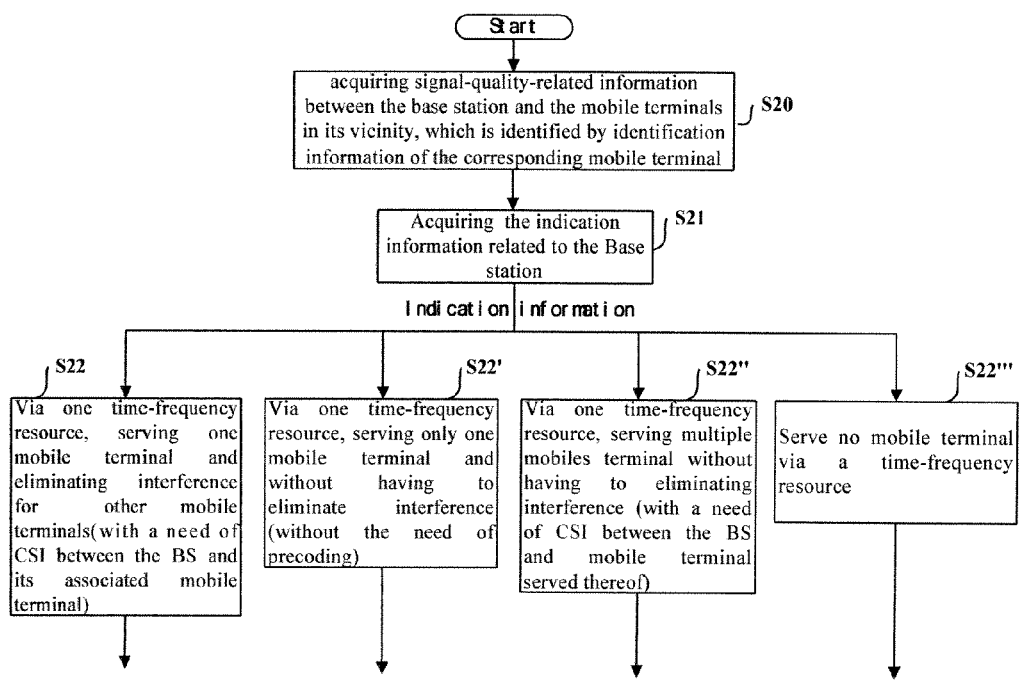
FIG. 3 shows a flow chart of the method for conducting a MIMO communication based on scheduling with the mobile terminal in the base station of the wireless network according to one embodiment of the present invention.

FIG. 3 shows a flow chart of the method for conducting a MIMO communication based on scheduling with the mobile terminal in the base station of the wireless network according to one embodiment of the present invention. More description is given in combination with FIG. 1.

Firstly, in step S20, each of the base stations in FIG. 1 acquires the signal-quality-related information between itself and every mobile terminal in its vicinity.

For the case in FIG. 1 that base station is independent to the scheduling apparatus physically, the acquisition, in Step 21, of the indication information relevant to the base station is implemented by the following sub-step, not shown in FIG. 1.

S211: to report the acquired signal-quality-related information between the base station and every mobile terminal in its vicinity to the scheduling apparatus to which the base station belongs to.

S212: to receive, from the scheduling apparatus, the indication information relevant to the base station, wherein the indication information is used for indicating one or more mobile terminals associated with the base station.

Wherein, according to one variation of present invention, in the sub-step S211, each base station screens the acquired signal-quality-related information between itself and each mobile terminal, which may, specifically, result in the signal-quality-related information for indicating that the mobile terminal is about to conduct a inter-cell handoff and the signal-quality-related information for indicating signal quality is above the forth predetermined threshold. And the above signal-quality-related information is ready for being rendered to scheduling apparatus D. Assuming that signal quality between base station a and mobile terminal 2 is bad, worse than the fourth predetermined threshold, and mobile terminal 2 does not need a inter-cell handoff, then base station a may choose not to report to scheduling apparatus D with the quality between itself and mobile terminal 2. It should be understood that, for the following scheduling, when scheduling apparatus D chooses a service base station or an interference-eliminating base station for some mobile terminal, it may make the above choice only among those base stations having respectively reported the signal-quality-related information between themselves and that mobile terminal.

In step S21, after acquisition of indication information from scheduling apparatus D, each base station performs corresponding operation based on the indication information. Brief description is made as follows, with base stations a, b, c as example respectively, and reference is made to the necessary part of the above context.

The simplest case is denoted in step S22', on one time-frequency resource, some base station has merely one mobile terminal associated with the base station itself, that is, the base station only needs to serve one mobile terminal, and does not have to eliminate interference for any mobile terminal. The above case corresponds to the base station c shown in FIG. 1. Then base station c only needs utilizing all its transmitting antenna to transmit, via the time-frequency resource of T1F1, downlink signal to mobile terminal 1 with current single-user MIMO technology. The single-user MIMO technology available for base station c includes space-time coding, spatial multiplexing, spatial diversity and so on.

As to the case for base station b, base station b needs to serve 2 mobile terminals: mobile terminal 0, mobile terminal 2. Therefore, in Step S22' base station b needs to pre-code the service data to be transmitted to the above 2 mobile terminals, and it only needs to be aware of the instant channel response matrix H_b0 between base station b and mobile terminal 0 and H_b2 between base station b and mobile terminal 2 to generate the pre-coded matrix. The way base station b transmits downlink signal to mobile terminal 0, mobile terminal 2 includes multi-user MIMO or beam forming and so on.

As to the case for base station a, base station a needs to both serve mobile terminal 0 by utilizing the time-frequency resource of T1F1 and eliminate interference for mobile terminal 1. Therefore, in step S22, base station a only needs to know the instant channel response matrix H_a0 between base station a itself and mobile terminal 0 and H_a2 between base station a itself and mobile terminal 2. Multi-user MIMO or beam forming etc. can be utilized for base station a to serve mobile terminal 0 and simultaneously eliminate the interference for mobile terminal 1.

Since, for base station a, b, CSI needs to be acquired for the generation of pre-coded matrix, then, when they ever got the information of RSSI or CQI rather than CSI in step S20, base station a, b have to detect, e.g. channel estimation etc., the corresponding channel indicated by scheduling apparatus D. And when acquired information in step S20 is CSI, base stations a,b may directly apply the CSI relevant to the corresponding mobile terminal of all the acquired CSI to the generation of pre-coded matrix. During the interval between a scheduling and the one next to it, the base station may acquire the CSI repeatedly to real-timely update the pre-coded matrix used by their own.

According to one embodiment of the present invention, assuming that cooperative base stations in the coverage area of scheduling apparatus D further comprises base station e, corresponding to S22''' in FIG. 3, not shown in the Figure, and the signal quality between base station e and each mobile terminal is very bad, then since base station e has not reported the signal-quality-related information between itself and any of the mobile terminals, or regardless of a report of the signal-quality-related information from base station e, scheduling apparatus D finds, by analysis, that base station e is not a appropriate to serve as a service base station for any mobile terminal, scheduling apparatus D does not indicate base station e to serve some mobile terminal, and of course no request for interference elimination by base station e. Except for the above case, base station e may not be required to serve other mobile terminal or eliminate interference for some mobile terminal via T1F1 because of no remaining spatial diversity for base station e via T1F1.

It should be understood by those skilled in the art that, in the foregoing specification, the relative order of the steps in every Flowchart of the present invention only applies to the embodiments of the invention and does not intend to bring a limitation to protection scope of present invention. The protection scope of the present invention is defined by the appended claims.

Figure 4:
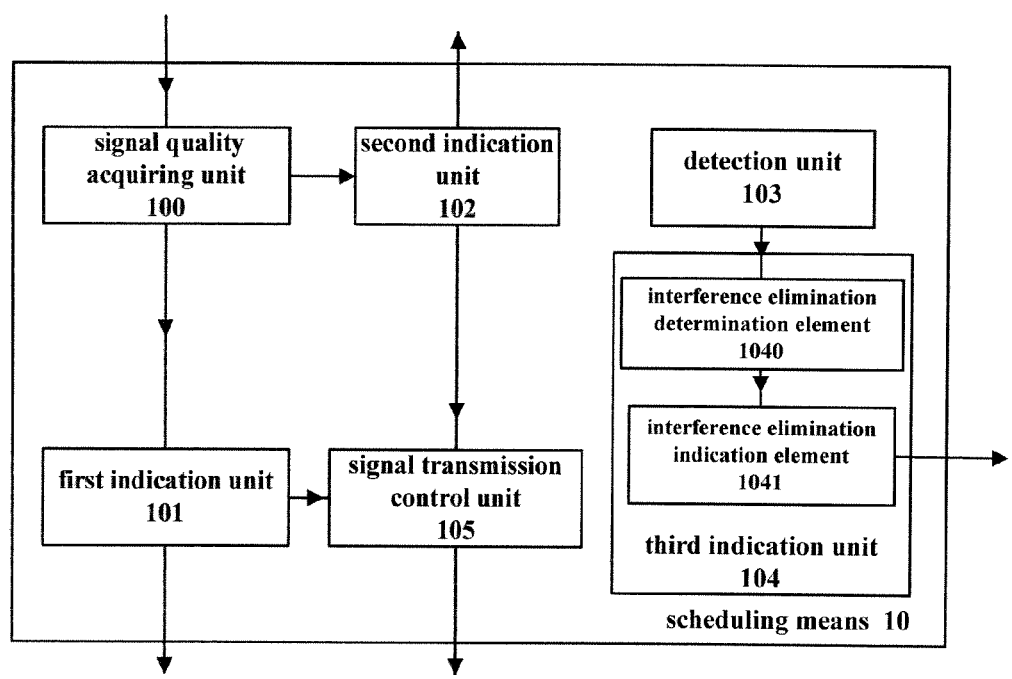
FIG. 4 shows a function block diagram of a scheduling apparatus for scheduling MIMO communication between mobile terminal and multiple cooperative base stations located in the cooperative area under the control of a scheduling apparatus in the scheduling apparatus of the wireless network, according to one embodiment of the present invention.

FIG. 4 shows a functional block diagram of a scheduling apparatus for scheduling MIMO communication between mobile terminal and multiple cooperative base stations located in the cooperative area under the control of a scheduling apparatus in the scheduling apparatus of the wireless network, according to one embodiment of the present invention.

The shown scheduling means 10 comprises: a signal quality acquiring unit 100, a first indication unit 101, a second indication device 102, a detection unit 103, a third indication unit 104 and a signal transmission controlling unit 105. Wherein, the third indication unit 104 further comprises an element for determining elimination of interference 1040, and an element for indicating elimination of interference 1041.

Firstly, the signal quality acquiring unit 100 in scheduling apparatus D acquires signal-quality-related information independently between base station a, base station b, base station c and mobile terminals in their respective vicinity. In this embodiment, scheduling apparatus D is a network device physically separated to each base station, and receives the signal-quality-related information, e.g. RSSI, between each base station and mobile terminal 0, mobile terminal 1, mobile terminal 2, which is reported by base station a, b, c. In an variation, assuming that the functionality of scheduling apparatus D in integrated into base station a, then, as to base station a therein, the functionality of the signal quality acquiring unit 100 comprises: acquiring independently the RSSI respectively between base station a itself and mobile terminals 0, 1, 2; receiving the RSSI reported by base stations b,c. Without loss of generality, exemplary description is given as follows for the case in which base station is physically separated to scheduling apparatus D as shown in FIG. 1.

The signal quality acquiring unit 100 provides every indication unit with the acquired signal-quality-related information based respectively on which each indication unit conducts the corresponding indication to each base station. Discussion is given respectively for the mobile terminals shown in FIG. 1.

for mobile terminal 0, with the indication, by RSSI, that the relationship of the signal quality (abbreviated as $S_X$, wherein X is the reference number for corresponding base station) between it and base station a,b,c as follows: $S_a > S_b > S_c$, and $S_a - S_b <$ a first predetermined threshold (TH1), and $S_a - S_c >$ TH1, then, the first indication unit 101 indicates that base station a, b cooperatively serve as the service base station of mobile terminal 0 and transmit, by utilizing the same time-frequency resource: T1F1, downlink signal to mobile terminal 0. wherein the mobile terminal0 is assumed to meet the above condition and be served by base station a,b. It should be understood by one skilled in the art that: the signal quality between one mobile terminal and base station a, b, c respectively may be very close to each other, then, the first indication unit 101 indicates any 2 of the 3 base station: a,b,c or all the 3 base stations to transmit the downlink signal to the mobile terminal via the same time-frequency resource: T1F1. Considering the number of base stations by which one mobile terminal can be served concurrently depends on receiving capability (e.g. number of receiving antenna) and the MIMO mode adopted by the mobile terminal, thus, when the signal quality between one mobile terminal and base station a, base station b, base station c is respectively almost the same with each other, scheduling apparatus D determines the one or more of the 3 base stations that serve the mobile terminal according to its receiving capability and corresponding MIMO mode. In this embodiment, without loss of generality, one mobile terminal is assumed to be served by, at most, 2 base stations concurrently.

for mobile terminal 1, 2, with their respective indication that the signal quality between them two and one base station is good and even better than the signal quality between them 2 and any other base station by a second predetermined threshold, the second indication unit 102 indicates that base station c, which ranks first among all the base stations for signal quality between mobile terminal 1 and all the base stations respectively, serve as the service base station of mobile terminal 1 to transmit downlink signal to it.

Providing that the first and second indication unit of scheduling apparatus D indicates that base station a, b, c transmit independently, by utilizing the same time-frequency resource: T1F1, downlink signal to their served mobile terminal respectively.

Then, the detection unit 103 of scheduling apparatus D can detect that base station a, b, c transmit independently, by utilizing the same time-frequency resource, downlink signal to their served mobile terminal respectively. Hereafter, merely based on the above, the third indication unit 104 may indicate each cooperative base station to eliminate the interference introduced by the reuse of time-frequency resource.

However, there exists a blindness in the above way. For an instance, even if base station a transmits, by its maximum power, downlink signal to mobile terminal 0 which is served by base station a without eliminating the interference of mobile terminal 2, the signal quality of the signal from base station has been severely deteriorated, before the signal reaches mobile terminal 2 because base station, which leads little interference to mobile terminal 2, because base station a is very far away from mobile terminal 2. if, at this time, base station a is indicated transmit downlink signal to mobile terminal 0 via by utilizing T1F1 and eliminate the interference for mobile terminal 2 at the same time, then spatial diversity on the resource of T1F1 will be consumed in vain.

Based on this, with mobile terminal 0 as an example, preferably, interference elimination determination element 1040 in the third indication unit 104 determines, upon the signal-quality-related information, whether or not the signal quality between base station c and mobile terminal 0 is higher than a third predetermined threshold. Only when the quality of signal between base station c and mobile terminal 0 is above the third predetermined threshold, does interference elimination determination element 1040 inform interference elimination indication element 1041 to indicate base station c to suppress the interference introduced to mobile terminal 0 by transmission to mobile terminal 1 while, at the same time, the base station c transmits the signal to mobile terminal 1; likewise, for mobile terminal 1, only when the determination by interference elimination determination element 1040 denotes that the quality of signal between either base station a or base station b and mobile terminal 1 is more than the third predetermined threshold, does interference elimination indication element 1041 indicate that the corresponding base station to suppress the interference introduced to mobile terminal 1. for mobile terminal 2, it follows a rule similar to the above the determination of whether the base station a,c needs to apply an interference suppression to it.

Preferably, scheduling apparatus D also considers the spatial diversity of each base station via some time-frequency resource. For an instance, assuming that spatial diversity of base station a is 2 (representing that the total number of mobile terminal that the base station a can both serve and eliminate interference for does not exceed 2), then, after the determination that base station a serve mobile terminal 0 via T1F1, base station has only 1 spatial diversity remained via T1F1. and after the further determination that base station a apply interference suppression to mobile terminal 1 via T1F1, base station a has no spatial diversity, via T1F1, left and it can not serve more mobile terminal or apply interference suppression to more mobile terminal. The consideration for the spatial diversity within scheduling apparatus D can be implemented by the spatial diversity monitoring element which is not shown in the figures and performs corresponding action on every indication unit based on remaining spatial diversity of each base station.

The signal transmission control unit 105 is mainly used to control, base on indication information acquired by every indication unit, to dispatch service data to be transmitted to each mobile terminal to each service base station specified for the corresponding mobile terminal.

Figure 5:
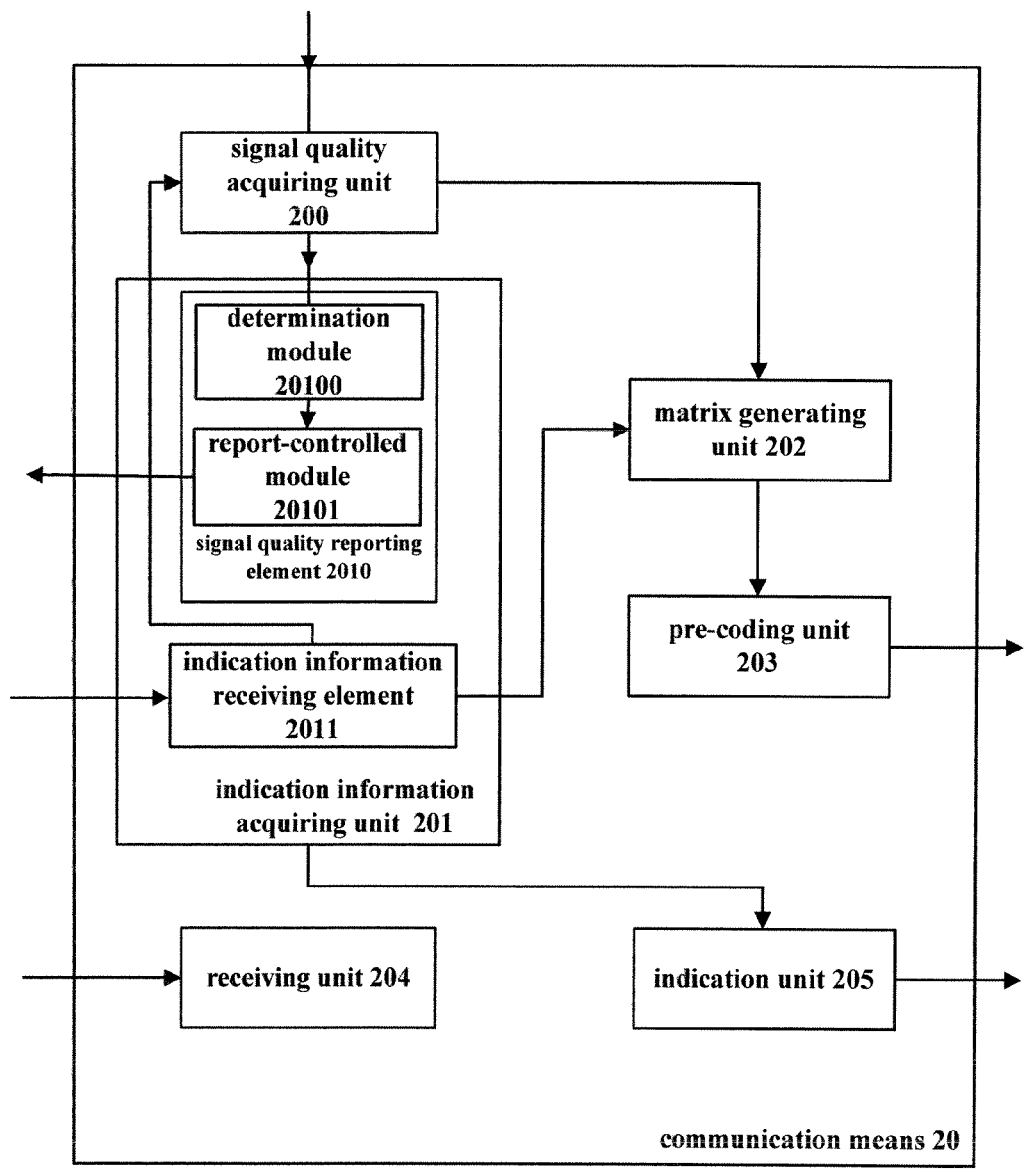
FIG. 5 shows a function block diagram of a communication means for conducting a MIMO communication based on scheduling with the mobile terminal in the base station of the wireless network according to one embodiment of the present invention.

FIG. 5 shows a functional block diagram of a communication means for conducting a MIMO communication based on scheduling with the mobile terminal in the base station of the wireless network according to one embodiment of the present invention. More descriptions are given still in combination with FIG. 1.

A communication means 20 is configured within every base station shown in FIG. 1, which comprises: a signal quality acquiring unit 200, a indication information acquiring unit 201, a matrix generating unit 202, a pre-coding unit 203, a receiving unit 204 and an indication unit 205, wherein, the indication information acquiring unit 201 further comprises: a signal quality reporting element 2010, and an indication information receiving element 2011, more specifically, the signal quality reporting element 2010 further comprises a determination module 20100 and a report-controlled module 20101.

Firstly, the signal quality acquiring unit 200 in each of the base stations in FIG. 1 respectively acquires the signal-quality-related information between the mother base station in which it resides and every mobile terminal in the vicinity of the mother base station.

For the case shown in FIG. 1 that base station is independent to the scheduling apparatus physically, indication information acquiring unit 201 has its sub-device operating as follows:

The signal quality reporting element 2010 reports the signal-quality-related information, acquired by the signal quality acquiring unit 200, between the base station and every mobile terminal in its vicinity to the scheduling apparatus to which the base station belongs to.

The indication information receiving element 2011 receives, from the scheduling apparatus, the indication information relevant to the base station.

Wherein, according to one variation of present invention, the determination module 20100 in the signal quality reporting element 2010 screens the acquired signal-quality-related information between the mother base station in which it resides in and each mobile terminal, which may, specifically, result in the signal-quality-related information for indicating that the mobile terminal is about to conduct a inter-cell handoff and the signal-quality-related information for indicating signal quality is above the forth predetermined threshold, which is delivered to the report-controlled module 20101 to report scheduling apparatus D. Assuming that signal quality between base station a and mobile terminal 2 is bad, e.g. worse than the fourth predetermined threshold, and mobile terminal 2 does not need a inter-cell handoff, then the determination module 20100 within base station a may choose not to report to scheduling apparatus D with the quality between itself and mobile terminal 2. It should be understood that, for the following scheduling, when scheduling apparatus D chooses a service base station or a interference-eliminating base station for some mobile terminal, it may make the above choice only among those base stations having respectively reported the signal-quality-related information between themselves and that mobile terminal.

Henceforth, the base station performs corresponding operation based on the indication information acquired by the indication information acquiring unit 201. Brief description is made as follows, with base stations a, b, c as example respectively, and reference is made to the necessary part of the above context.

The simplest case is exemplarily denoted with base station c: base station c only needs utilizing all its transmitting antenna to transmit, via the time-frequency resource of T1F1, downlink signal to mobile terminal 1 with current single-user MIMO technology. The single-user MIMO technology available for base station c includes space-time coding, spatial multiplexing, spatial diversity and so on. For simplicity, the processing device used for single-user MIMO is not shown in the figure.

base station b needs to serve 2 mobile terminals: mobile terminal 0, mobile terminal 2. Therefore, pre-coding unit 203 of base station b needs to pre-code the service data which is received from scheduling apparatus D and to be transmitted to the above 2 mobile terminals, and the matrix generating unit 202 only needs to be aware of the instant channel response matrix H_b0 between base station b and mobile terminal 0 and H_b2 between base station b and mobile terminal 2 to generate the pre-coded matrix. Base station b can transmit downlink signal to mobile terminals 0, 2 via the same time-frequency resource by means of multi-user MIMO or beam forming and so on.

Base station a needs to both serve mobile terminal 0 by utilizing the time-frequency resource of T1F1 and eliminate interference for mobile terminal 1. Therefore, the matrix generating unit 202 only needs to know the instant channel response matrix H_a0 between base station a itself and mobile terminal 0 and H_a2 between base station a itself and mobile terminal 2. The way in which base station a serves mobile terminal 0 and simultaneously eliminates the interference for mobile terminal 1 includes multi-user MIMO or beam forming and so on.

Since, for base stations a, b, CSI needs to be acquired for the generation of pre-coded matrix, then, when the information acquired ever by the signal quality acquiring unit 200 is RSSI or CQI rather than CSI, a unit for acquiring channel quality have to detect, e.g. channel estimation etc., the corresponding channel according to the indication information to attain the CSI. And when the information acquired by the signal quality acquiring unit 200 is exactly CSI, pre-coding device within the base station may directly apply the corresponding-mobile terminal-related part of all the acquired CSI to the generation of pre-coded matrix. During the interval between a scheduling and the one next to it, a base station may acquire the CSI repeatedly to real-timely update the pre-coded matrix of its own.

According to one embodiment of the present invention, base station a is a scheduling apparatus, and receiving unit 204 of the communication means 20 thereon receives, from other base stations, and converges the signal-quality-related information between each of the base stations and the mobile terminals in its vicinity respectively. And indication unit 205 dispatches the indication information locally acquired by indication information acquiring unit 201 to each of the other base station.

When the scheduling apparatus is not equipped with the spatial diversity monitoring device for monitoring the remaining capability of spatial diversity for each base station, the communication means 20 of each base station should be equipped with the device having similar functionality to monitor the remaining spatial diversity capability of its own so as to determine whether or not to follow the corresponding scheduling instruction from the scheduling apparatus.

Figure 6:
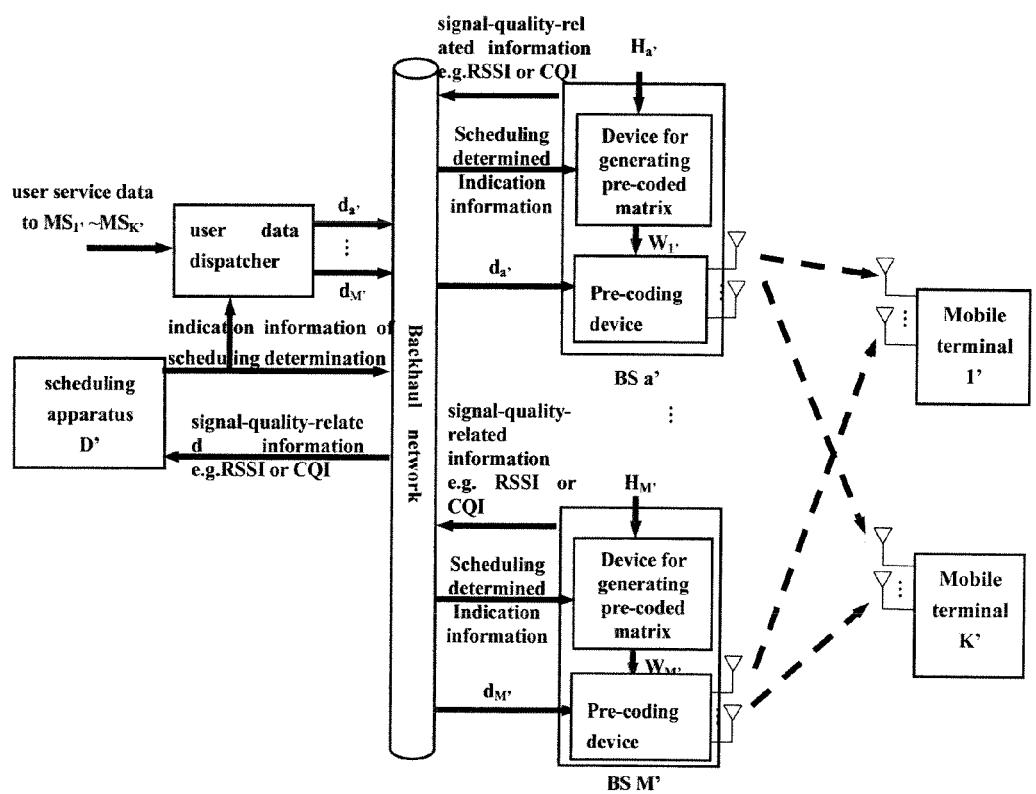
FIG. 6 shows a diagram of the system for conducting a multi-base station cooperative MIMO with low information interaction and the scheduling therein according to one embodiment of the present invention.

FIG. 6 shows a diagram of the system for conducting a multi-base station cooperative MIMO with low information interaction and the scheduling therein according to one embodiment of the present invention, wherein M cooperative base stations of which all belong to the same scheduling apparatus D' are connected to scheduling apparatus D' a via Backhaul network.

Base station i (i=1, . . . , M) has a pre-coded matrix generator, namely, the matrix generating unit hereinbefore, for calculating base station i's own pre-coded matrix Wi so as to implement SDMA and interference elimination. The pre-coder is actually pre-coding device hereinbefore.

The system shown in FIG. 6 has a work flow as follows in view of the above corresponding content.

1) each base station reports signal-quality-related information, e.g. RSSI or CQI, between mobile terminals and the base station itself to scheduling apparatus D' via the Backhaul network;

2) scheduling apparatus D' determines service relation between each cooperative base station and mobile terminals, and schedules the determined indication information to be transmitted to the corresponding cooperative base station. With the scheduling determination under the control of scheduling apparatus, user data dispatcher may correspondingly transmit the user data stream to the service base station of corresponding mobile terminal. Di, as shown in the Figure, represents the user data stream to be transmitted to base station i;

3) Based on indication information of scheduling determination, base station i detect the CSI, e.g. Hi, between base station i itself and the mobile terminal associated with base station i, and the matrix generating device for generating a pre-coded matrix of base station i generates, according to the above CSI, pre-coded matrix Wi to carry out the beam forming or multi-user MIMO.

It should be understood that, the Backhaul network shown in FIG. 6 merely exemplary illustrates the connection among the base stations and the connection between each base station and the scheduling apparatus. For practical networking, the networking manner may take the form of star, bus, or any other networking topology.

Hereinbefore, description is given for some embodiments of present invention, however, present invention is not limited to particular system, device, or protocol. And the one skilled in the art can make all kinds of variation or amendment within the scope of claims that issue from this application.

What is claimed is:

1. A method executed by a scheduling apparatus of a wireless network, for scheduling Multiple-Input Multiple-Output (MIMO) communication between a mobile terminal and multiple cooperative base stations located in a cooperative area and under control of said scheduling apparatus, said method comprising:

acquiring signal-quality-related information between each of said multiple cooperative base stations and corresponding multiple mobile terminals in a vicinity of the base stations;

determining a value which represents a difference in a quality of multiple optimal signals relevant to at least one of the mobile terminals as indicated by the acquired signal-quality-related information; and when the determined value is less than a first predetermined threshold, indicating at least two base stations among the multiple base stations relevant to said multiple optimal signals to serve as service base stations of said at least one mobile terminal and transmit, via a same time-frequency resource, a downlink signal to said at least one mobile terminal;

wherein when said signal-quality-related information indicates that the signal quality between a mobile terminal and one of said multiple base stations is better, by at least a second predetermined threshold, than the signal quality between said mobile terminal and any other base station and said mobile terminal is located within said cooperative area, indicating a base station having an optimal signal quality for signals between said mobile terminal and said multiple base stations to serve as a service base station of said mobile terminal and transmit a downlink signal to said mobile terminal; and wherein said indicating at least two base stations to transmit, via the same time-frequency resource, the downlink signal to said at least one mobile terminal by utilizing one of space-time coding, spatial multiplexing or spatial diversity; and the method further comprises:

controlling transmission of service data corresponding to said each mobile terminal to one or more service base stations of said each mobile terminal.

2. A method executed by a scheduling apparatus of a wireless network, for scheduling Multiple-Input Multiple-Output (MIMO) communication between a mobile terminal and multiple cooperative base stations located in a cooperative area and under control of said scheduling apparatus, said method comprising:

acquiring signal-quality-related information between each of said multiple cooperative base stations and corresponding multiple mobile terminals in a vicinity of the base stations;

determining a value which represents a difference in a quality of multiple optimal signals relevant to at least one of the mobile terminals as indicated by the acquired signal-quality-related information;

when the determined value is less than a first predetermined threshold, indicating at least two base stations among the multiple base stations relevant to said multiple optimal signals to serve as service base stations of said at least one mobile terminal and transmit, via a same time-frequency resource, a downlink signal to said at least one mobile terminal;

for each said mobile terminal, detecting whether or not there exists other at least one base station sharing the same time-frequency resource with the service base station of said mobile terminal, wherein said service base station transmits, by utilizing said same time-frequency resource, downlink signal to said mobile terminal, and said other at least one base station transmits, by utilizing said same time-frequency resource, downlink signal to other mobile terminals; and if there exists said other at least one base station sharing the same time-frequency resource with said service base station of said mobile terminal, indicating said other at least one base station to eliminate the interference for said mobile terminal; and further comprising:

if there exists said other at least one base station sharing the same time-frequency resource with said service base station of said mobile terminal, determining, based on said signal-quality-related information, at least one base station of which signal quality between said one or more base stations and said mobile terminal is higher than a third predetermined threshold; and indicating said at least one base station of which signal quality between said at least one base station and said mobile terminal is higher than said third predetermined threshold to eliminate the interference for said mobile terminal.

3. A method, executed by a base station of a wireless network, for conducting a Multiple-Input Multiple-Output (MIMO) communication with a mobile terminal based on scheduling, said method comprising:

acquiring signal-quality-related information between said base station and each mobile terminal in a vicinity of said base station;

acquiring indication information relevant to said base station, indicating mobile terminals associated with said base station;

when said indication information indicates that said mobile terminals associated with said base station include multiple mobile terminals which need a downlink signal transmission via a same time-frequency resource from said base station, generating a pre-coded matrix according to Channel Status Information (CSI) between said base station and the multiple mobile terminals; and pre-coding, by utilizing said pre-coded matrix, service data to be transmitted to the multiple mobile terminals so as to generate pre-coded downlink signals to be transmitted to the multiple mobile terminals.

4. The method according to claim 3, wherein said generating of the pre-coded matrix further comprises:

when said indication information indicates that said mobile terminals associated with said base station include multiple mobile terminals to which said base station is required to transmit, via the same time-frequency resource, a downlink signal and another at least one mobile terminal for which said base station is required to eliminate interference, generating said pre-coded matrix according to CSI between said base station and said multiple mobile terminals served by said base station and CSI between said base station and said another at least one mobile terminal;

and said pre-coding further comprises:

pre-coding, by utilizing said pre-coded matrix, downlink signals to be transmitted to said multiple mobile terminals so as to generate pre-coded downlink signals to be transmitted to said multiple mobile terminals;

or said generating of the pre-coded matrix comprises:

when said indication information indicates that said mobile terminal associated with said base station includes one mobile terminal to which said base station is required to transmit a downlink signal and another one or more mobile terminals for which said base station is required to eliminate interference, said base station generating said pre-coded matrix according to CSI between said base station and said mobile terminal served by said base station and CSI between said base station and said another one or more mobile terminals;

and said pre-coding comprises:

pre-coding, by utilizing said pre-coded matrix, service data to be transmitted to said mobile terminal so as to generate pre-coded downlink signals to be transmitted to said mobile terminal.

5. The method according to claim 3, wherein the method further comprises:

receiving signal-quality-related information reported by other at least one base station; and said indicating further comprises:

determining associated indication information for said base station and said other one or more base stations respectively according to said signal-quality-related information acquired by said base station and signal-quality-related information reported by said other one or more base stations, said indication information is used for indicating mobile terminals respectively associated with said other one or more base stations;

and the method further comprises:

informing said other one or more base stations with said associated indication information respectively determined for said other one or more base stations.

6. The method according to claim 3, wherein said indicting further comprises:

acquiring indication information relevant to said base station, wherein said indication information is used for indicating a mobile terminal associated with said base station;

reporting the acquired signal-quality-related information between said base station and each mobile terminal in the vicinity of said base station to scheduling apparatus to which said base station belongs;

receiving indication information relevant to said base station from said scheduling apparatus, wherein, said indication information is used for indicating one or more mobile terminal associated with said base station;

wherein said reporting further comprises:

determining signal-quality-related information indicating that signal quality is above a fourth predetermined threshold therein, among all said acquired signal-quality-related information between said base station and each mobile terminal in the vicinity of said base station;

reporting said determined signal-quality-related information indicating that signal quality is above said fourth predetermined threshold therein to said scheduling apparatus.

7. A scheduling apparatus of a wireless network that schedules Multiple-Input Multiple-Output (MIMO) communication between a mobile terminal and multiple cooperative base stations under a control of said scheduling apparatus, said scheduling apparatus being provisioned to:

acquire siqnal-quality-related information between each of said multiple cooperative base stations and multiple mobile terminals in a vicinity of said each of said multiple cooperative base stations;

provide a first indication, when a signal-quality-related information relevant to a mobile terminal indicates that the difference among the quality of multiple optimal signals is less than a first predetermined threshold, which indicates at least two base stations of the multiple base stations relevant to the quality of said multiple optimal signals to serve as service base stations of said mobile terminal and transmit, via a same time-frequency resource, a downlink signal to said mobile terminal; and provide a second indication, when said signal-quality-related information indicates that the signal quality between a mobile terminal and one of said multiple base stations is better, by at least a second predetermined threshold, than the signal quality between said mobile terminal and any other base station and said mobile terminal is located within said cooperative area, which indicates the base station having an optimal signal quality for signals between said mobile terminal and said multiple base stations to serve as service base station of said mobile terminal and transmit a downlink signal to said mobile terminal;

wherein said first indication further indicates, when a signal-quality-related information relevant to a mobile terminal indicates that the difference among quality of multiple optimal signals is less than a first predetermined threshold, at least two base stations of multiple base stations relevant to said quality of said multiple optimal signals to serve as a service base station of said mobile terminal and transmit, via the same time-frequency resource, the downlink signal to said mobile terminal by utilizing Space-time coding, spatial multiplexing or spatial diversity;

the scheduling apparatus further being provisioned to:

control transmission of service data corresponding to said each mobile terminal to one or more service base stations of said each mobile terminal.

8. A scheduling apparatus of a wireless network that schedules Multiple-Input Multiple-Output (MIMO) communication between a mobile terminal and multiple cooperative base stations under a control of said scheduling apparatus, said scheduling apparatus being provisioned to:

acquire signal-quality-related information between each of said multiple cooperative base stations and multiple mobile terminals in a vicinity of said each of said multiple cooperative base stations;

provide a first indication, when a signal-quality-related information relevant to a mobile terminal indicates that the difference among the quality of multiple optimal signals is less than a first predetermined threshold, which indicates at least two base stations of the multiple base stations relevant to the quality of said multiple optimal signals to serve as service base stations of said mobile terminal and transmit, via a same time-frequency resource, a downlink signal to said mobile terminal;

detect, for each said mobile terminal, whether or not there exists another one or more base stations sharing the same time-frequency resource with the service base station of said mobile terminal, wherein said service base station transmits, by utilizing said same time-frequency resource, downlink signal to said mobile terminal, and said another one or more base stations transmit, by utilizing said same time-frequency resource, downlink signal to other mobile terminals; and provide a third indication, if there exists said another one or more base stations sharing the same time-frequency resource with said service base station of said mobile terminal, which indicates said another one or more base stations to eliminate the interference for said mobile terminal;

wherein to provide said third indication, the scheduling apparatus is further provisioned to:

if there exists said another one or more base stations sharing the same time-frequency resource with said service base station of said mobile terminal, then determine, based on said signal-quality-related information, one or more base stations of which signal quality between said one or more base stations and said mobile terminal is higher than a third predetermined threshold; and indicate said one or more base stations of which signal quality between said one or more base stations and said mobile terminal is higher than said third predetermined threshold to eliminate the interference for said mobile terminal.

9. A communication apparatus, in a base station of wireless network, that conducts, based on scheduling, a Multiple-Input Multiple-Output (MIMO) communication with the mobile terminal, said communication apparatus being provisioned to:

acquire signal-quality-related information between said base station and each mobile terminal in the vicinity of said base station;

acquire, according to said acquired signal-quality-related information, indication information relevant to said base station, wherein said indication information is used for indicating the mobile terminal associated with said base station;

generate, when said indication information indicates that said mobile terminal associated with said base station includes multiple mobile terminals to which said base station is required to transmit a downlink signal via a same time-frequency resource, a pre-coded matrix according to Channel Status Information (CSI) between said base station and said multiple mobile terminals; and pre-code, by utilizing said pre-coded matrix, service data to be transmitted to said multiple mobile terminals so as to generate pre-coded downlink signals to be transmitted to said multiple mobile terminals.

10. The communication apparatus according to claim 9, further provisioned to:

generate, when said indication information indicates that said mobile terminal associated with said base station includes multiple mobile terminals to which said base station is required to transmit a downlink signal via the same time-frequency resource and another one or more mobile terminals for which said base station is required to eliminate interference, said pre-coded matrix according to CSI between said base station and said multiple mobile terminals served by said base station and CSI between said base station and said another one or more mobile terminals; and pre-code, by utilizing said pre-coded matrix, downlink signals to be transmitted to said multiple mobile terminals so as to generate pre-coded downlink signals to be transmitted to said multiple mobile terminals;

or generate, when said indication information indicates that said mobile terminal associated with said base station includes one mobile terminal to which said base station is required to transmit a downlink signal and another one or more mobile terminals for which said base station is required to eliminate interference, said pre-coded matrix according to CSI between said base station and said mobile terminal served by said base station and CSI between said base station and said another one or more mobile terminals; and pre-code, by utilizing said pre-coded matrix, service data to be transmitted to said mobile terminal so as to generate pre-coded downlink signals to be transmitted to said mobile terminal.

11. The communication apparatus according to claim 9, further provisioned to:

receive signal-quality-related information reported by other one or more base stations;

determine respectively associated indication information for said base station and said other one or more base stations according to signal-quality-related information acquired by said base station and signal-quality-related information reported by said other one or more base stations, wherein said indication information is used for indicating one or more mobile terminals associated with said base station; and inform said other one or more base stations with said associated indication information respectively determined for said other one or more base stations.

12. The communication apparatus according to claim 9, further provisioned to:

report the acquired signal-quality-related information between said base station and each mobile terminal in the vicinity of said base station to scheduling apparatus to which said base station belongs; and receive indication information relevant to said base station from said scheduling apparatus, wherein, said indication information is used for indicating one or more mobile terminal associated with said base station.

13. The communication apparatus according to claim 12, wherein further provisioned to:

determine signal-quality-related information indicating that signal quality is above a fourth predetermined threshold therein, among all the acquired signal-quality-related information between said base station and each mobile terminal in the vicinity of said base station; and report the determined signal-quality-related information indicating that signal quality is above said fourth predetermined threshold therein to said scheduling apparatus.

* * * * *